(No Model.)
W. T. BOTHWELL.
AUTOMATIC PNEUMATIC BRAKE.
No. 444,146. Patented Jan. 6, 1891.
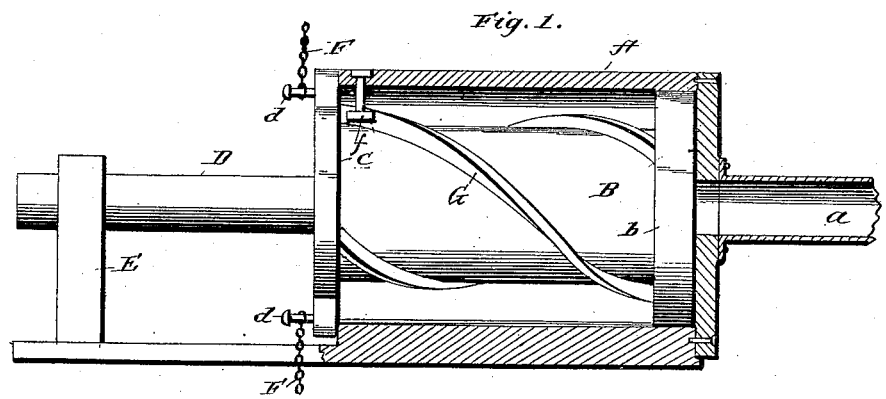
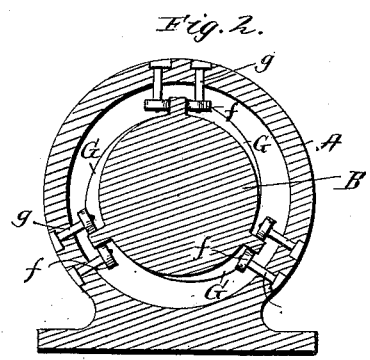
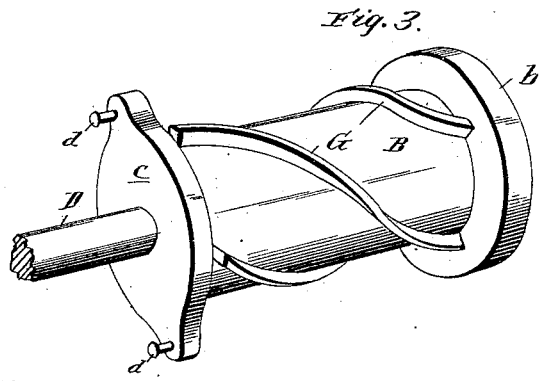
Witnesses:
C. H. Raeder
Thomas E. Turpin
Inventor
William T. Bothwell
By James J. Shuhy
Attorney

UNITED STATES PATENT OFFICE.

WILLIAM T. BOTHWELL, OF JERSEY CITY, NEW JERSEY, ASSIGNOR OF ONE-HALF TO ALFRED R. BOLUSS, OF NORWOOD, OHIO.

AUTOMATIC PNEUMATIC BRAKE.

SPECIFICATION forming part of Letters Patent No. 444,146, dated January 6, 1891.

Application filed May 31, 1890. Serial No. 353,720. (No model.)

*To all whom it may concern:*

Be it known that I, WILLIAM T. BOTHWELL, a citizen of the United States, residing at Jersey City, in the county of Hudson and State of New Jersey, have invented certain new and useful Improvements in Automatic Pneumatic Brakes; and I do declare the following to be a full, clear, and exact description of the invention, such as will enable others skilled in the art to which it appertains to make and use the same.

This invention has relation to car-brakes, and is designed as an improvement upon the devices shown and described in my application for Letters Patent filed April 18, 1890, Serial No. 348,514.

In the application referred to I have illustrated my invention in connection with a brake-rod, brake-lever, and chains; but such parts are omitted from the present application, as they form no part of my invention, and with the cross reference made herein I deem a description of such devices unnecessary. In said application I have shown and described a piston with a plurality of spiral grooves, and employ balls engaging the grooves, so as to impart to the piston a partial rotation or rocking motion simultaneously with its backward and forward or reciprocating movements, and thereby cause a draft upon the brake-chains at each outward stroke of the piston.

In the present invention I have simplified the construction of the parts by omitting the grooves in the piston, the balls for engaging the grooves, and consequently the ring or annulus which holds the balls in position.

The improvements will be fully understood from the following description and claims, when taken in connection with the annexed drawings, in which—

Figure 1 is a longitudinal vertical sectional view of a brake-cylinder, showing the piston with my improvements in position. Fig. 2 is a cross-sectional view of the same, and Fig. 3 is a perspective view of the piston removed from the cylinder.

Referring by letter to the said drawings, A indicates the piston or brake-cylinder, which is of a construction substantially the same as that in my application above referred to, having at one end an induction-pipe $a$, which is designed to communicate with the fluid-pressure-line-pipe or a pipe leading from a storage-cylinder, as the case may be.

B indicates the piston which is arranged within the cylinder, and is provided with a head $b$ for the impact of the steam or fluid pressure. The piston B is provided at its opposite end with a plate $c$, and from this plate extends a stem or rod D, passing through a suitable guide E. The plate $c$ is provided at diametrically opposite points with pins or studs $d$ for the attachment of brake-chains, such as F.

Between the head $b$ and the plate $c$ the piston is provided lengthwise with a series of spiral flanges G, there being preferably three of such flanges employed, for a purpose which will be presently explained.

Secured in the open or outer end of the cylinder A are guides composed of rollers $f$. These guides are arranged in pairs, one on each side of the spiral flanges G and in close relation thereto, said guides having stems or shafts $g$ secured in the wall of the cylinder, and the friction-rollers $h$ are journaled on the inner ends of said shafts, so that as the piston is driven forwardly and rearwardly it will be given a partial rotatable movement.

In operation, when air or fluid is let into the cylinder through the pipe $a$, it will first act upon the head $b$ of the piston, driving the latter outwardly, and the rollers engaging the flanges of said piston will direct it in a partly-rotatable direction. This movement will cause the plate $c$ to move in a corresponding direction, and through the medium of the chains F and suitable brake mechanism brakes may be applied to the wheels of a car-truck. As pressure is relieved on the head $b$ of the piston the latter will be allowed to reverse its movement and consequently release the brake.

I am aware that a steam-engine has been constructed with a piston having a flat or rectangular portion intermediate of its length and a cylinder arranged loosely on said rectangular portion, the cylinder having a reverse spiral groove arranged between two heads and a pin or trundle head projecting inwardly from the steam-cylinder and entering the grooves in the headed cylinder.

Having described my invention, what I claim is—

1. In a car-brake, the combination, with a piston or brake-cylinder having roller-guides in one end, of a piston adapted to receive brake-chains and having longitudinal spiral flanges adapted to move between the guides in the cylinder, substantially as specified.

2. The combination, with the brake-cylinder having the roller-guides arranged in pairs in one end thereof, of the piston having longitudinal spiral flanges embraced by said guides, and also having a plate at its outer end for the attachment of brake-chains, substantially as specified.

In testimony whereof I affix my signature in presence of two witnesses.

WILLIAM T. BOTHWELL.

Witnesses:
OTTO CROUSE,
WILLIAM A. KENT.